July 22, 1958 — H. E. SIETMAN — 2,844,134
VALVE SPRING RETAINER ASSEMBLY
Filed Nov. 15, 1954
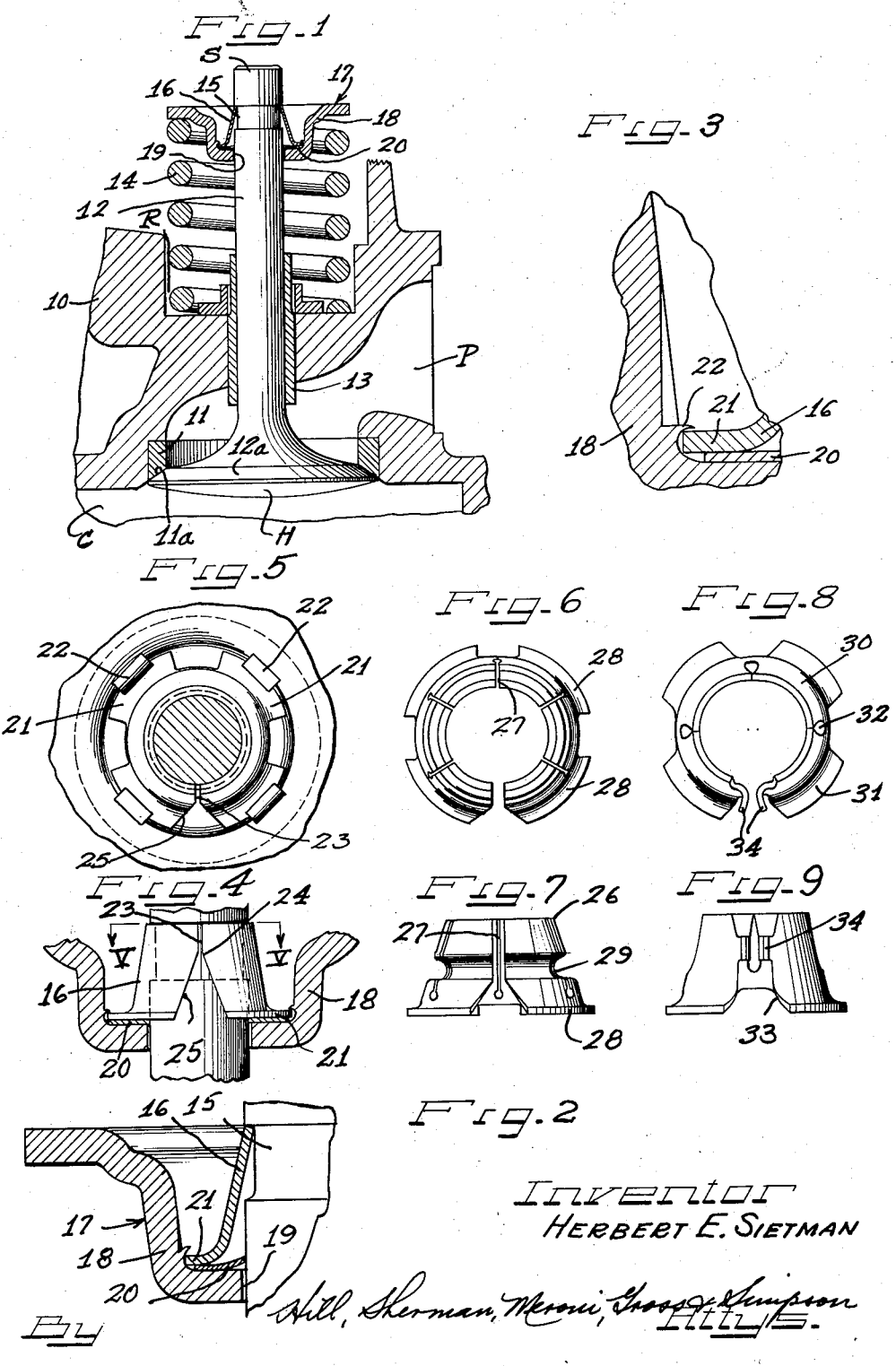
Inventor
HERBERT E. SIETMAN United States Patent Office 2,844,134
Patented July 22, 1958

2,844,134

VALVE SPRING RETAINER ASSEMBLY

Herbert E. Sietman, Bay Village, Ohio, assignor to Thompson Products, Inc., Cleveland, Ohio, a corporation of Ohio Application November 15, 1954, Serial No. 468,748

18 Claims. (Cl. 123—188)

This invention relates to valve spring retainer assemblies as used on poppet valves in internal combustion engines, and more particularly to a valve spring retainer assembly which will fit the standard valve stem groove.

Heretofore, in valve spring retainer assemblies the valve spring retainer lock consisted of two semi-circular parts or halves which together constitute a split retainer lock. The lock is constructed to fit a complementally shaped valve stem groove and a valve spring abutment plate, and since many forms of valve stem grooves exist a valve lock must be specially formed and fitted for each and every form of valve stem groove. In assembling, the two valve lock halves are fitted around the valve stem in the groove and manually held there until the abutment plate surrounds the valve spring retainer lock to hold it in place. Hence, the installation is time consuming and involves the usage of special tools.

Also, in the past, seepage of oil along the valve stem caused difficulty in operation of the poppet valves, and especially in overhead valve engines the oil would cake or coke along the valve stem guide thereby causing faulty operation of the poppet valves. The faulty operation due to this condition is commonly known in the field as "sticky valves."

Accordingly, it is an object of this invention to obviate the above named difficulties and provide a valve spring retainer assembly which may be quickly and easily installed on a valve stem and may be more cheaply manufactured.

Another object of this invention is to provide a valve spring retainer assembly to be used on poppet valves in internal combustion engines including means for preventing the seepage of oil along the valve stem.

Still another object of this invention lies in the provision of a valve spring retainer assembly including a retainer cap, a washer sized to grasp the valve stem with an interference fit, and a valve spring retainer lock assembled as a single unit before installing same on a poppet valve of an internal combustion engine.

Still another object of this invention lies in the provision of a valve spring retainer assembly to be used on poppet vlaves of internal combustion engines wherein the assembly will fit the standard valve stem groove.

Another object of this invention is to provide a method of assembling the components of the valve spring retainer assembly and mounting the assembly on the grooved end of the valve stem.

Still another object is to provide a one-piece resilient valve spring retainer lock of frusto-conical shape, wherein the load imparted by the valve spring to the lock is absorbed along the longitudinal axis of the latter.

A further object of this invention resides in the provision of a one-piece resilient valve spring retainer lock of frusto-conical shape constructed to lock the retainer cap in place with respect to the grooved end of a valve stem and to be easily and quickly removed therefrom when disassembling.

Still a further object of this invention resides in the provision of a valve spring retainer assembly having a valve spring retainer cap with means to hold the valve spring retainer lock in a predetermined position before slipping the valve spring retainer assembly over the grooved end of a valve stem.

Other objects, features and advantages of this invention will be apparent from the following detailed disclosures, taken in conjunction with the accompanying drawings, in which:

Figure 1 is a vertical cross sectional view, with parts in elevation, of a poppet valve assembly equipped with one form of the valve spring retainer assembly according to this invention;

Figure 2 is an enlarged fragmentary elevational view of the valve spring retainer assembly of Fig. 1 showing in greater detail the relative positions of the parts therein;

Figure 3 is an enlarged fragmentary elevational view of the invention in Fig. 1 showing the relationship of some of the parts in greater detail;

Figure 4 is an enlarged side elevational view, with some parts in section, showing the manner in which the valve spring retainer lock surrounds the valve stem and locks in the valve stem groove;

Figure 5 is a cross sectional view, taken substantially along lines V—V of Fig. 4;

Figure 6 is a top plan view of another form of valve spring retainer lock;

Figure 7 is a side elevational view of the valve spring retainer lock shown in Fig. 6;

Figure 8 is a top plan view of still another form of valve spring retainer lock; and Figure 9 is a side elevational view of the valve spring retainer lock shown in Fig. 8.

As shown in Fig. 1, the reference numeral 10 indicates an engine part such as, for example, a portion of the cylinder head of an internal combustion engine. The engine part 10 defines a combustion chamber C and a port P, such as an exhaust port. A valve seat insert 11 is secured in the mouth of the port P and has a beveled seating face 11a facing the combustion chamber C. A poppet valve 12 has a head H for closing the port P, this head having a beveled seating face 12a coacting with the seat 11a of the insert 11. The stem S of the valve 12 is slidably mounted in a stem guide 13 carried by the engine part 10. The stem guide 13 projects from the port P through a wall of the engine part into a recess R in the engine part 10. A heavy valve spring 14 is bottomed within the recess R on the engine part 10.

The valve stem S has a conventional or standard annular retainer lock groove 15 adjacent the free end thereof, the upper annular shoulder provided by the groove being adapted to coact with the upper peripheral edge of a one-piece valve spring retainer lock 16 of the valve spring retainer assembly, generally designated by the numeral 17.

The valve spring retainer assembly 17 comprises the valve spring retainer lock 16, a generally hat-shaped valve spring retainer cap 18 centrally apertured in the crown at 19, and a washer 20 sized to grasp the valve stem with an interference fit to prevent oil seepage therealong.

The valve spring retainer lock 16 is preferably made of spring steel and heat treated to a spring temper, and in its free and unconfined state, it is open, as shown by the modified forms in Figs. 6 and 8, so that it will slide over the valve stem easily. When the lock 16 is confined in the retainer cap 18, it will take the shape as best shown in Figs. 1, 2, 4 and 5. In this position the inside diameter of the top of the lock will be the same as, or slightly smaller than, the groove diameter on the valve stem S. The valve spring retainer lock 16 is frusto-conically shaped with circumferentially spaced lateral flanges 21 at its base. These flanges 21 are adapted to be received within the retainer cap 18 and seated on the crown beneath appropriately spaced and positioned inwardly extending lugs or stakes 22, as shown in Figs. 1, 2, 3, 4 and 5. The retainer lock 16 is split or separated at 23, thereby defining a slot extending from the top peripheral edge downwardly to a point intermediate the height of the lock, as indicated at the numeral 24. From the point 24 to the base of the lock, an opening, triangular in shape, designated by the numeral 25, is provided.

In assembling the valve spring retainer assembly 17, the thin washer 20, preferably made of metal, is inserted within the retainer cap 18 and bottomed on the crown below the lugs 22. The metal washer 20 is sized to pass by the lugs 22 without interference. In some cases, the washer 20 may be eliminated without hindering the operation of the retainer assembly. The flexible one-piece valve spring retainer lock 16 is then radially compressed adjacent the flanges 21 by applying pressure at a point below the point designated by numeral 24, wherein the triangular shaped opening 25 will allow the diameter of flanges 21 of the lock 16 to shrink and the flanges will then pass by the lugs 22. Then the lock is allowed to expand and is held in place by the outward radial pressure of its flange against the spring retainer cap 18. Now the valve retainer assembly 17 can be slid over the free end of the stem S of the poppet valve 12, and due to the resilience of the lock 16 the inside diameter at the top of the lock will enlarge until the lock snaps in place in the groove 15, at which time the inside diameter then will be the same, or slightly smaller than the groove diameter on the valve stem. The brim of the hat-shaped retainer cap 18 will engage the spring 14 and move it to a predetermined spring loading position. And as already explained the metal washer 20 which is held in place by the lock 16 will grasp the valve stem with an interference fit, thereby preventing oil seepage along the stem to later cake or coke about the stem guide which will hinder operation of the poppet valve 12. Hence, the assembled unit will now provide a seal against oil seepage on the stem. The spring load imparted to the lock 16 will be absorbed along the frusto-conical wall between the flange end and the upper peripheral edge.

In removing the unit from the valve stem, pressure is applied against the lock 16 below point 24 thereby reducing the flange diameter so that the flanges may pass upwardly by the retainer lugs 22. The valve spring 14 is compressed by pushing the retainer cap 18 downwardly, and the lock then being free of the retainer cap 18 will remain in position and the lock will come out of the cavity in which it was held. Subsequently, the lock 16 is able to expand to its free state, as illustrated by the modified locks in Figs. 6 and 8, and the top peripheral edge will free itself of the stem groove 15 and then slide upwardly over the free end of the stem S. Then the remaining components of the valve retainer assembly, namely the washer 20 and the retainer cap 18 are free to slide from the free end of the valve stem S.

In the modified valve spring retainer lock 26, shown in Figs. 6 and 7, the lock also takes the general shape of the frustum of a cone. Circumferentially spaced vertical slots 27 extending from the top peripheral edge of the lock downwardly to a point short of the base flanges 28, provide additional flexibility of the inside diameter at the top of the lock, which is utilized when sliding the valve spring retainer assembly including a lock of this type over the free end of a stem of the poppet valve. An annular groove 29 is disposed between the top peripheral edge of the lock 26 and the flange base and parallel thereto for providing additional stabilizing support relative to the valve stem, wherein the groove defines a circular shoulder for engaging the valve stem below the valve stem groove. The inside diameter of the circular shoulder is slightly larger than the inside diameter of the top peripheral edge of the lock.

In Figs. 8 and 9, another form of valve spring retainer lock is shown as designated by the numeral 30. The lock 30 is also frusto-conically shaped with base flanges 31 and spaced slots 32 extending from the top peripheral edge of the lock downwardly to a point short of the flanged base. Also, the lock 30 is slotted from the top peripheral edge through the flanged bottom providing edges 33 which carry laterally extending fingers 34 intermediate their ends, wherein a tool such as a screwdriver may be inserted between the fingers to increase the distance therebetween and thereby enlarge the top inside diameter of the lock to allow the assembly to be removed from the free end of the valve stem without removing the lock from beneath the retaining lugs of the retainer cap 18.

It is to be understood that the modified forms of the valve spring retainer locks, shown in Figs. 6 to 9, perform substantially the same function as the lock 16 of Figs. 1 to 5, and may be associated with the valve spring retainer assembly 17 in substantially the same manner. Also, the modified forms of valve spring retainer locks are constructed of spring steel as is the lock 16.

It will be understood that modifications and variations may be effected without departing from the scope of the novel concepts of the present invention.

I claim as my invention:

1. A valve spring retainer lock comprising a one-piece resilient split ring of frusto-conical shape and outwardly flanged at one end for engagement with a complementally formed valve spring retainer.

2. A valve spring retainer lock for a valve assembly which comprises a one-piece resilient split ring, said ring having a frusto-conically shaped body and a plurality of circumferentially spaced flanges extending outwardly from the base of said frusto-conical body and transversely thereto for engagement with a complementally formed valve spring retainer.

3. A valve spring retainer lock for a valve assembly which comprises a one-piece resilient annulus, said annulus having a frusto-conically shaped body, a slot disposed along said body permitting said annulus to expand and contract, said slot being wider at the bottom of said annulus, and a plurality of circumferentially spaced flanges extending outwardly from the base of said frusto-conical body.

4. A valve spring retainer lock for a valve assembly which comprises a one-piece resilient split ring, said ring having a frusto-conically shaped relatively thin walled body portion, the upper periphery of said body portion sized to be received within a valve stem groove in locking relation thereto, and a plurality of circumferentially spaced outwardly extending horizontal flanges on the lower periphery of said body portion for engaging a valve retainer.

5. A valve spring retainer lock for a valve assembly which comprises a one-piece resilient split ring, said ring having a smooth walled frusto-conical portion, and a plurality of circumferentially spaced flanges horizontally extending outwardly along the bottom periphery of said ring for engagement with a complementally formed valve spring retainer.

6. A valve spring retainer lock for a valve assembly which comprises a one-piece resilient hollow generally frusto-conically shaped member, said member having a relatively thin wall of substantially uniform thickness, a plurality of laterally extending flanges on the lower peripheral edge of said wall for resiliently engaging the valve spring retainer, a plurality of slots in said wall providing flexibility therein, and a slot extending the full length of said wall permitting the lock to be installed in a valve assembly.

7. A valve spring retainer lock for a valve assembly which comprises a one-piece resilient hollow generally frusto-conically shaped member, said member having a relatively thin wall of substantially uniform thickness, a plurality of laterally extending flanges on the lower peripheral edge of said wall for resiliently engaging the valve spring retainer, a plurality of slots extending from the upper peripheral edge of said wall to a point short of the bottom peripheral edge, and one slot extending the full length of said wall.

8. A valve spring retainer lock for a valve assembly which comprises a one-piece resilient hollow generally frusto-conically shaped member, said member having a relatively thin wall of substantially uniform thickness, a plurality of laterally extending flanges on the lower peripheral edge of said wall, a plurality of slots extending from the upper peripheral edge of said wall to a point short of the bottom peripheral edge, and one slot extending the full length of said wall and a circumferential abutment intermediate the peripheral edges of said wall, but parallel thereto, whereby said shoulder is sized to contact the cylindrical surface of the valve stem.

9. A one-piece valve spring retainer lock for a valve assembly which comprises a hollow resilient frusto-conically shaped member, said member having a relatively thin wall of substantially uniform thickness, a plurality of laterally extending flanges on the lower peripheral edge of said wall, slots in said wall providing flexibility therein, a vertical opening in said wall, and a laterally extending lug projecting from each vertical edge of said opening intermediate said peripheral edges of said wall.

10. In a valve spring retainer assembly, a grooved valve stem receiving a hat-shaped retainer cap, a washer received by said valve stem and within said retainer cap seated on the crown thereof, said washer having an interference fit with said valve stem preventing oil seepage past said washer, and a hollow frusto-conically shaped valve spring retainer lock laterally flanged along the base, said lock having an upper periphery engaged by said valve stem groove and said flanged portion engaging said washer.

11. In a valve assembly including a valve having a smooth stem of substantially uniform diameter along its length with an annular groove adjacent its free end, and a generally hat-shaped valve spring retainer cap disposed about said grooved stem portion with the interior facing the free end of the valve stem, the combination with a washer received on said stem below said groove and within said retainer cap, said washer grasping the stem with an interference fit for preventing oil seepage along said stem, and a one-piece resilient valve spring retainer lock holding the washer in position within said cap and engaging said stem groove.

12. In a valve assembly for engines or the like, a valve having a smooth stem of substantially uniform diameter along its length with an annular groove adjacent its free end, a centrally apertured hat-shaped retainer cap disposed about said grooved stem with the interior facing the free end of the valve stem, a valve spring contacting said cap in biased relationship, a washer received by said stem and within said cap, said washer grasping the stem with an interference fit to prevent oil seepage along said stem, a one-piece resilient frusto-conically shaped valve spring retainer lock laterally flanged at its base, the top periphery of said lock received by said stem groove, and means in said retainer cap, holding the flanged end of said lock in position over said washer.

13. In a valve assembly for engines or the like, a valve having a smooth stem of substantially uniform diameter along its length with an annular groove adjacent its free end, a centrally apertured hat-shaped retainer cap disposed about said grooved stem with the interior facing the free end of the valve stem, a valve spring contacting said cap in biased relationship, a washer received by said stem and within said cap, said washer grasping the stem with an interference fit to prevent oil seepage along said stem, a one-piece resilient frusto-conically shaped valve spring retainer lock laterally flanged at its base, the top periphery of said lock received by said stem groove, and means in said retainer cap holding the flanged end of said lock in position over said washer, said means comprising lugs inwardly projecting from the interior of said retainer cap adjacent the apertured end thereof for co-acting with the cap bottom and side to define hold-down members for receiving the flanged end of said lock.

14. A valve spring retainer cap for a valve assembly which comprises a centrally apertured hat-shaped member adapted to be received over a valve stem for retaining a valve spring, and circumferentially spaced lugs inwardly projecting from the inner cylindrical wall of said cap near the apertured end for receiving the flanged end of a valve spring retainer lock.

15. A valve spring retainer assembly to be received on a grooved free end of a valve stem for operatively connecting a valve spring a valve which comprises a centrally apertured hat-shaped retainer cap, a washer received within said cap adjacent the apertured end thereof, said washer sized to grasp the valve stem with an interference fit for prevention of oil seepage, a one-piece resilient valve spring retainer lock received within said cap having a flanged end, and means in said cap for holding said lock and washer in place at the apertured end thereof, whereby installation of said assembly is accomplished by merely slipping the assembly over the grooved free end of the valve stem.

16. A valve spring retainer and lock assembly comprising a hat-shaped retainer having a brim for abutting a valve spring and an apertured crown for receiving a valve stem therethrough, a valve stem encircling spring lock in said hat having one end bottomed in the crown of the retainer and a remote contractible and expansible end adapted to resiliently snap into a valve stem groove to thrust against the groove side wall for locking the retainer on the valve stem.

17. A snap on valve spring retainer and lock which comprises a retainer cap adapted to receive a valve stem therethrough and a snap lock carried by said retainer adapted to contract into a valve stem groove for thrusting thereagainst to lock the retainer on the valve stem.

18. In a valve assembly for engines or the like, a valve having a smooth stem of substantially uniform diameter along its length with an annular groove adjacent its free end, a centrally apertured retainer cap disposed about said grooved stem, a valve spring contacting said cap in biased relationship, a washer received by said stem and associated with said cap, said washer grasping the stem with an inteference fit to prevent oil seepage along said stem, a one-piece resilient frusto-conically shaped valve spring retainer lock laterally flanged at its base, the top periphery of said lock received by said grooved stem, and means on said retainer cap holding the flanged end of said lock in position over said washer, said means comprising lugs inwardly projecting from said retainer cap for coacting with the cap to define bolted-down members for receiving the flanged end of said lock.

References Cited in the file of this patent

UNITED STATES PATENTS

| 491,469 | Carver | Feb. 7, 1893 |
| 1,554,227 | Nickol | Sept. 22, 1925 |
| 1,761,925 | Lampman | June 3, 1930 |
| 1,947,534 | Payne | Feb. 20, 1934 |
| 1,965,718 | Wiley | July 10, 1934 |
| 2,250,793 | Feick | July 29, 1941 |

FOREIGN PATENTS

| 474,513 | France | Feb. 24, 1915 |